Figure 1:
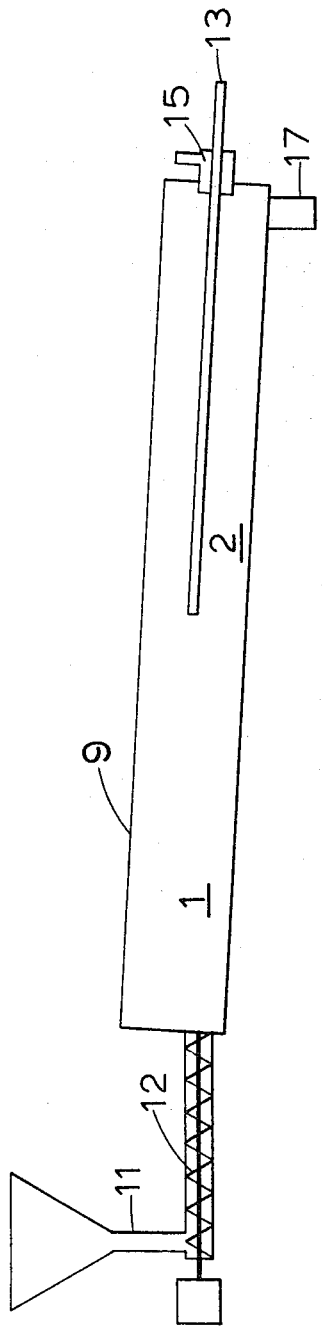

Aug. 20, 1968  H. J. DEERY  3,398,009
OXIDATION TREATMENT OF CARBON BLACK
Filed March 23, 1965  2 Sheets-Sheet 2

H. J. DEERY
INVENTOR.

United States Patent Office 3,398,009
Patented Aug. 20, 1968

3,398,009
OXIDATION TREATMENT OF CARBON BLACK
Hugh J. Deery, Jamaica Plain, Mass., assignor to Cabot Corporation, Boston, Mass., a corporation of Delaware
Filed Mar. 23, 1965, Ser. No. 442,057
11 Claims. (Cl. 106—307)

The present invention relates generally to aftertreatment of carbon black and more particularly to oxidation treatment of carbon black at elevated temperatures.

Carbon black is a well-known and important material of commerce. Said material has found application in numerous and varied areas, such as, reinforcing agents for rubbers and elastomers, pigments for plastics, paints, lacquers, inks, etc. Obviously, a single carbon black is not suitable for use in all applications; hence, various carbon black producing processes have evolved, such as the thermal, oil furnace, gas furnace and channel processes which produce carbon blacks having substantially different properties. Moreover, certain qualities of blacks can be modified after production thereof.

A particularly important aftertreatment process broadly comprises subjecting a black to nitrogenous oxidizing agents at elevated temperatures. Said process has been found to be particularly valuable in the treatment of furnace blacks. The changes in properties of the resulting oxidized blacks are generally found to render the black superior for certain applications such as reinforcing agents for low scorch vulcanized rubber compositions and ink pigments having long flow characteristics.

Heretofore, said process hs generally been carried out by subjecting a black to a nitrogeneous oxidizing agent in a treating zone maintained at the desired temperature. In order that the process be continuous, untreated black and oxidizing agent is continuously fed into one end of said zone and the treated black is exited from the other end. Prior packaging and use of the treated black, it is necessary that nitrogeneous oxidation by-products and residues deposited on the black and which are extremely toxic, be removed. Said removal is generally accomplished by subjecting the black to temperatures above about 300° F. while purging with air and passing the gases released through an extensive scrubbing apparatus prior to disposal. In addition to the problems involved in the disposal of said toxic by-products and residues and the expensive scrubbing towers, pumps, conduits, leaching fields, and the like required therefor, the loss of said by-products represents still another significant economic shortcoming of prior art processes.

In accordance with the present invention, however, these problems have been solved.

It is a principal object of the present invention to provide a novel process for oxidizing carbon black in which the recovery and recycling of valuable oxidizing agents is economically accomplished.

It is another object of the present invention to provide a process for treating the carbon black which results in an oxidized carbon black product having very low concentration of oxidation by-products or oxidizing agents associated therewith.

Other objects of the present invention will in part be obvious and will in part appear hereinafter.

The above and other objects and advantages of the present invention are accomplished when carbon black is conveyed through an enclosed heated first zone to which certain nitrogenous oxidizing agents are charged, and subsequently into a second zone which is heated to a higher temperature than, and is in open communiction with, said first zone and to which a free oxygen containing gas is charged.

A better understanding of the process of the present invention can be had when reference is made to the accompanying drawings forming part hereof wherein:

FIGURE 1 comprises a schematic side elevation of an apparatus suitable for the purposes of the present invention.

Figure 2:
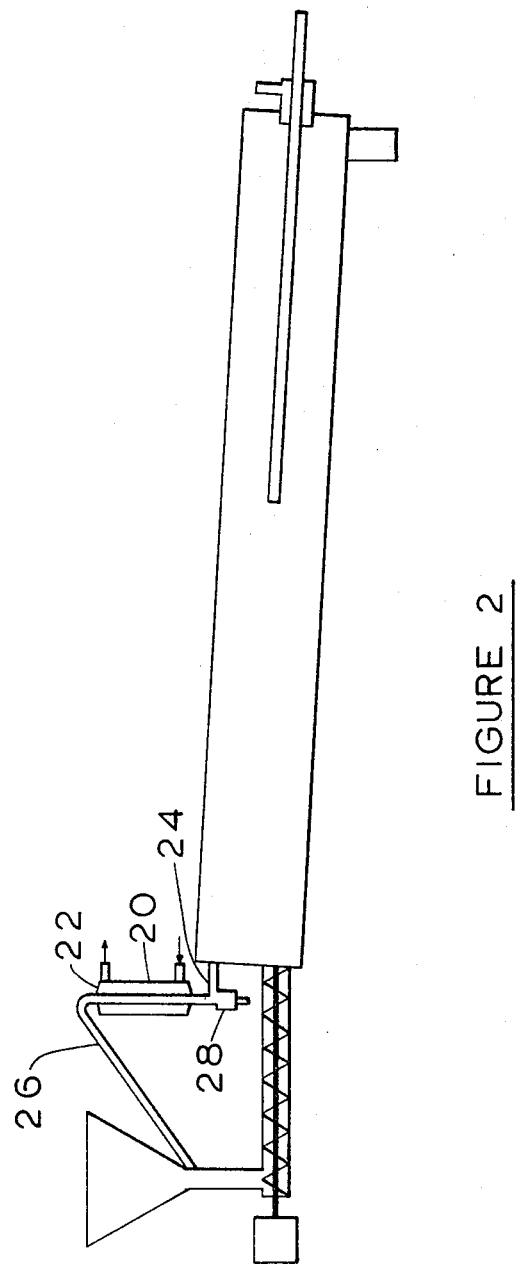

FIGURE 2 comprises a schematic side elevation of a preferred apparatus suitable for the purposes of the present invention.

Referring now to FIGURE 1, carbon black is charged via conduit 11 and screw 12 into rotating enclosure 9, comprising two zones, 1 and 2. Zone 1, the first zone, is normally heated to temperatures between about 150° F. and about 300° F. A nitrogenous oxidizing agent, which will be more fully discussed hereinafter is also charged into either end of the apparatus, as liquid or vapor, or adsorbed on the carbon black entering zone 1. In the apparatus illustrated in FIGURE 1, the nitrogenous oxidizing agent is introduced into zone 1 through conduit 13. Said oxidizing agent contacts the black in zone 1 as the resulting reaction mixture moves slowly into zone 2 which is heated to a temperature high enough to cause oxidation by-products and any remaining oxidizing agent to be desorbed from the black. Meanwhile, free oxygen-containing gas is introduced near the downstream end of zone 2, the second zone, through conduit 15. The entry of said gas at this point countercurrent the flow of black tends to cause said desorbed by-products to flow countercurrent the flow of black while simultaneously chemically combining with a portion of said by-products to reform nitrogenous oxidizing agents. Said reformed oxidizing agents flow countercurrent the flow of black into zone 1 wherein said agents again contact untreated or partially treated black. The treated black exits zone 2 through outlet 17 substantially freed from oxidizing agent residues or oxidation by-products. Further, substantially no oxidizing agent residues or oxidation by-products escape through outlet 17.

By nitrogenous oxidizing agents is meant nitric acid and nitrogen oxides. Oxidizing nitrogen oxides are well known and include, for instance, nitrogen dioxide, nitrogen tetroxide and nitrogen pentoxide. When nitric acid is the oxidizing agent to be utilized, said acid can be fuming, concentrated or dilute and can be utilized in liquid or vapor form. Generally speaking, however, nitric acid of at least 40% concentration is preferred.

The manner in which the nitrogenous oxidizing agent is introduced is generally not critical. For instance, said agent can normally be charged into any portion of the first or second zones or can be mixed with the black prior to introduction thereof into the first zone. Preferably, however, the oxidizing agent is introduced as a vapor into the latter part of the first zone or into the second zone because more complete contact of the oxidizing agent and the black is thereby achieved and a greater degree of treatment per time elapsed is obtained in this manner. When, for instance, nitric acid is the oxidizing agent to be utilized, it can be volatilized such as by heating prior to introduction thereof.

The temperature of said first zone should be maintained within the range of between about 150° F. and about 300° F. Preferably, the temperatures therein are maintained at between about 200° F. and about 250° F. At temperatures substantially below about 150° F., for instance at about 120° F., oxidation of the black usually occurs at a very reduced rate. At temperatures substantially above about 300° F., the rate at which desorption occurs is vastly increased as compared to the rate of oxidation of the black and the degree of oxidation tends to be suppressed.

The temperature of the second zone should be maintained within the range of between about 250° F. and preferably 300° F., and about 400° F. in order to desorb free oxidation products and residues from the black. At temperatures substantially greater than about 400° F., i.e. at 500° F., the surface area and other properties of the carbon black being treated are substantially affected which is normally undesirable. For example, the surface area of a black is substantially increased by treatment with oxidizing agents at elevated temperatures.

It should be noted that the division of heated zones discussed hereinabove is to some extent artificial and is provided only to clarify the mechanics of the present process. Some oxidation of the black occurs in the second zone while some desorption occurs in said first zone. However, at the temperatures encountered in said second zone, desorption of oxidation residues and products occurs at a vastly greater rate than within said first zone and the overall effect in the second zone is a suppression of oxidation of the black. Thus, the present invention can be effected in heated zones which are physically separate or in a single enclosure which is selectively heated to first zone temperatures near the upstream end and second zone temperatures near the downstream end.

Oxygen-containing gases suitable for the purposes of the present invention are generally any gases comprising free oxygen. Obviously, it is normally important that substances present other than the free oxygen be substantially chemically inert with respect to the black, the oxidizing agents and the by-products of the oxidation reaction. Preferred for use in the present process due to the availability thereof in large quantities and the absence therein of substantial amounts of deleterious substances is dry air. Clearly, however, other free-oxygen containing gases such as helium/oxygen, nitrogen/oxygen, or oxygen alone are also suitable.

The amount of free oxygen-containing gas to be charged into the downstream end of the second zone is subject to considerable variation. The required amount for any particular run is dependent to a large extent upon such parameters as the type of black being treated, the amount of nitrogenous oxidizing agent charged into the first zone, the temperatures maintained within said first and second zones, the residence times of the black within said zones, the volumes and length of the zones, etc. Accordingly, said amount can best be determined during actual operations. Generally speaking, however, sufficient free oxygen-containing gas should be charged into the second zone to (a) provide at least a stoichiometric sufficiency of oxygen to convert substantially all nitrogen oxides wherein the valency of the nitrogen atom comprising a part of a nitrogen-oxygen bond is less than three such as NO to trivalent or higher valency nitrogen oxides, and (b) maintain the environment about the carbon black outlet substantially completely free from the presence of nitrogen oxides and/or nitric acid vapors. Preferably, an excess of free oxygen-containing gas is provided.

The point of entry of the free oxygen-containing gas and the direction in which it is charged into the second heated zone should be chosen so as to provide (a) a substantially complete purge or sweep of the environment about the carbon black outlet and (b) a flow countercurrent the flow of black. A convenient point of entry has generally been found to be at or immediately downstream from the black outlet. Preferably, said free oxygen-containing gas is preheated to between about 250° F. and about 400° F. prior to introduction thereof into zone 2.

Although benefits can be obtained when the black is conveyed through the heated zones without agitation thereof it is much preferred that said black be substantially constantly agitated within both of said heated zones. In this manner the black tends to be uniformly treated in each zone. Said agitation can be accomplished in any suitable manner such as by rolling the bed of black, using lifter blades or by vibrating the black while it is passing through the zones.

Although there is no intent to be bound by the following explanation it is believed that during the oxidation of a carbon black by a nitrogenous oxidizing agent such as nitric acid at elevated temperatures, the following reactions can occur:

(a) $4HNO_3 \rightarrow 4NO_2 + 2H_2O + O_2$
(b) $2NO_2 \rightarrow N_2O_4$
(c) $2NO_2 \rightarrow 2NO + O_2$
(d) $N_2O_4 \rightarrow 2NO + O_2$
(e) $4HNO_3 \rightarrow 2N_2 + 2H_2O + 5O_2$ It is pointed out that the reaction represented by Equation e is normally irreversible and accounts for the loss of nitrogenous oxidizing agent which must be replenished. The oxygen produced by said reactions reacts with the carbon black thereby driving said reactions toward completion. In accordance with the present invention, however, when a free oxygen-containing gas is charged to the second zone, a reversal of said reactions and in particular of Reactions c and d above probably occurs thereby reforming oxidizing agents suitable for the purposes of the present invention. Moreover, when water is present, nitric acid can be reformed:

(f) $3NO_2 + H_2O \rightarrow 2HNO_3 + NO$

It is pointed out, however, that when over a prolonged period of time large quantities of dilute nitric acid are utilized as the oxidizing agent or when the black being treated contains large amounts of moisture adsorbed thereon, some provision should be made for the removal of moisture from the system as otherwise the concentration of moisture may build up within the system and eventually interfere with the oxidative process. Removal of moisture is readily accomplished for example by utilizing the apparatus illustrated in FIGURE 2 which apparatus is essentially a duplicate of the apparatus illustrated in FIGURE 1 except that condenser 20 provided with water jacket 22 is arranged to withdraw gases from zone 1 by means of inlet 24 condense out the moisture therefrom and return the remaining gases through outlet 26. The moisture removed from the gases is disposed of through trap 28. Obviously, inlet 24 and outlet 26 can be positioned elsewhere if desired. Preferably, however, the gases from outlet 26 are fed to the cold carbon black feed stream as extremely efficient operation is thereby achieved.

In the following illustrative non-limiting examples, the extent of oxidation of the treated black is determined by analyzing the "volatile content" thereof. The analytical determination of "volatile content" comprises heating a known weight of dry black to about 1750° F. for a short time. After cooling, the black sample is again weighed and the resulting weights are applied to the following formula:

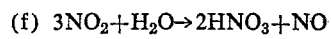

Percent volatile = $\dfrac{\text{Wt. before heating} - \text{Wt. after heating}}{\text{Wt. before heating}} \times 100$

Example 1

Apparatus of the type shown in FIGURE 1 comprising glass cylinder 9 of about 48 inches in length and an inside diameter of about 3.8 inches is preheated externally (not shown) to an average internal temperature of about 250° F. within zone 1 having a length of about 29 inches and an average temperature of about 350° F. in zone 2 having a length of about 19 inches. Cylinder 9 is then rotated at about 5 r.p.m. by external means (not shown) and Vulcan 9, an SAF pelletized oil furnace carbon black produced by Cabot Corporation having a volatile content of about 1.5% is continuously charged into zone 1 by means of conduit 11 and screw 12 at a rate of about 750 grams/hr. Simultaneously, there is charged into zone 1 through conduit 13, vapors of 70% nitric acid preheated to about 275° F. at a rate of about 45 grams/hr. Also, nitrogen preheated to about 250° F. was continuously charged through conduit 15 into zone 2 at a rate of about 3 c.f.h. It was visually noted that the environment immediately about outlet 17 and extending about 6 inches upstream therefrom was clear of rust colored fumes and remained clear for the entire run which lasted about 24 hours. The product was collected at outlet 17. At hourly intervals product samples were taken at outlet 17 and each sample was subjected to the above-described volatile test procedure. The average votaile content of the black product was found to be about 3.8% ±0.15. Moreover, the residue of acid on the carbon black product was determined to be so small as to be unmeasurable.

Example 2

This example was essentially a duplicate of Example 1 with the exception that instead of nitrogen, air preheated to about 250° F. was continuously charged through conduit 15 into zone 2 at a rate of about 3 c.f.h. The volatile content of the carbon black product was found to average about 4.5% ±0.15% and the acid residue thereof was found to be so small as to be unmeasurable.

When the above procedure is repeated with the exception that zone 2 is maintained at about 250° F. instead of about 340° F. the resulting carbon black has an average volatile content of about 4.6% but also has an acid residue of about 1% by weight of the black product which indicates that acid residues have remained on the black instead of desorbing therefrom.

Example 3

This example was a duplicate of Example 2 with the exception that the flow rate of 70% nitric acid vapor was reduced to about 20 grams/hr. The resulting carbon black had essentially the same volatile content and acid residue as the black product from Example 1. Accordingly, for a given amount of oxidation treatment, a substantially smaller amount of oxidizing agent need be utilized in the present process than in processes utilized heretofore.

Example 4

This example was a duplicate of Example 2 with the exception that instead of introducing $HNO_3$ vapors into zone 1, the feedstock black was wetted prior to introduction thereof into zone 1 with 70% nitric acid at a rate of about 6 parts 70% acid/100 parts by weight black.

The treated black was analyzed and was found to have a volatile content of about 4.0% and an acid residue which was so small as to be unmeasurable.

Example 5

This example was a duplicate of Example 2 with the exceptions that the carbon black charged to zone 1 which was heated to about 225° F. was Black Pearls 74, a pelletized channel black produced by Cabot Corporation which had an average particle diameter of about 17 millimicrons and a volatile content of about 5%. After rotation of cylinder 9 at about 5 r.p.m. was started, $NO_2$ gas was introduced through conduit 13 at a rate of about 1.0 c.f.h. Zone 2 was heated to about 375° F. Air was charged into the downstream end of zone 2 through conduit 15 at a rate of about 4 c.f.h. and the black was exited through outlet 17. The volatile content of the treated black was determined to be about 9%.

When the procedure of Example 5 was repeated with the exception that nitrogen gas was utilized instead of air, the volatile content of the black product was found to be about 7%.

Obviously, many changes can be made in the above examples and description without departing from the scope of the present invention.

For instance, although only oil furnace and channel blacks were treated in the above examples, clearly other types of carbon black can also be treated by the present process.

Also, the free oxygen-containing gas can be charged into the second heated zone in a manner different from that disclosed in the figures or examples. For instance, said gas can be introduced through outlet 17.

The heated zones can also be physically separated such as by using two apparatus of the type shown in FIGURE 1 in series. It is important, however, that said zones be in open communication with each other in order that (1) the carbon black can flow from one to the other, and (2) the gases desorbed in zone 2 can flow into zone 1.

Also, obviously, the residence time of the carbon black in the apparatus illustrated in FIGURES 1 and 2 can be controlled by controlling the extent of inclination and the speed of rotation of cylinder 12.

Accordingly, it is intended that the above disclosure be regarded as illustrative in nature and as in no way limiting the scope of the present invention.

What I claim is:

1. A novel process for oxidizing carbon black with a nitrogenous oxidizing agent which comprises providing first and second enclosed zones in open communication with each other, maintaining said first zone at temperatures between about 150° F. and about 300° F. and said second zone at temperatures between about 250° F. and about 400° F., charging (a) carbon black into said first zone nad conveying said black from said first zone into said second zone, (b) a nitrogenous oxidizing agent chosen from the group consisting of nitric acids, nitrogen oxides, and mixtures thereof into either zone, and (c) a free oxygen-containing gas into the downstream end of said second zone countercurrent the flow of black to provide a substantially complete purge of the environment about the carbon black outlet from the second zone, said free oxygen-containing gas being charged in an amount sufficient to provide at least a stoichiometric sufficiency of free oxygen to convert substantially all lower nitrogen oxides to nitrogen dioxide and collecting the resulting black product at the downstream end of said second zone provided that the temperature in the second zone is high enough to cause oxidation by products and remaining oxidizing agent to be desorbed from the black.

2. The process of claim 1 wherein said first zone is maintained at temperatures of between about 200° F. and about 250° F.

3. The process of claim 1 wherein said second zone is maintained at temperatures of between about 300° F. and about 400° F.

4. The process of claim 1 wherein said nitrogenous oxidizing agent is nitric acid.

5. The process of claim 1 wherein said nitrogenous oxidizing agent is nitric acid of at least about 40% concentration.

6. The process of claim 1 wherein said nitrogenous oxidizing agent is a nitrogen oxide.

7. The process of claim 1 wherein said free oxygen-containing gas is air.

8. The process of claim 1 wherein the carbon black introduced into said first zone is agitated during the residence thereof in said first and second zones.

9. The process of claim 1 wherein moisture is removed from the gases present in said zones.

10. The process of claim 1 wherein said nitrogenous oxidizing agent is introduced into said second zone.

11. The process of claim 1 wherein oxidation by-products and oxidizing agent desorbed from the black are taken outside the enclosed zones, treated to remove moisture therefrom and then readsorbed by fresh carbon black as it is being charged into said first zone.

References Cited

UNITED STATES PATENTS

| | | | |
|---|---|---|---|
| 2,420,810 | 5/1947 | Bray et al. | 23—209.1 |
| 2,686,107 | 8/1954 | Jordan | 23—209.1 |
| 3,023,118 | 2/1962 | Donnet | 106—307 |
| 3,226,244 | 12/1965 | Jordan et al. | 106—307 |

TOBIAS E. LEVOW, *Primary Examiner.*

S. E. MOTT, *Assistant Examiner.*